(12) United States Patent
Kiely

(10) Patent No.: US 7,604,261 B2
(45) Date of Patent: *Oct. 20, 2009

(54) WEATHERPROOF COMPRESSION CONNECTING ASSEMBLY FOR SECURING ELECTRICAL METAL TUBING

(75) Inventor: Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/986,726

(22) Filed: Nov. 26, 2007

(65) Prior Publication Data

US 2008/0143103 A1 Jun. 19, 2008

Related U.S. Application Data

(60) Division of application No. 11/005,214, filed on Dec. 6, 2004, now Pat. No. 7,390,027, which is a continuation-in-part of application No. 10/639,907, filed on Aug. 13, 2003, now abandoned.

(51) Int. Cl.
*F16L 33/00* (2006.01)
(52) U.S. Cl. .................. 285/248; 285/383; 285/342
(58) Field of Classification Search ............. 285/248, 285/339–343
See application file for complete search history.

(56) References Cited

U.S. PATENT DOCUMENTS

| | | | |
|---|---|---|---|
| 1,186,812 A | 6/1916 | McFerran | |
| 1,327,106 A | 1/1920 | Leahy | |
| 1,488,175 A | 3/1924 | Strandell | |
| 1,772,536 A | 8/1930 | Cox | |
| 1,796,806 A | 3/1931 | Pearson | |
| 1,809,583 A | 6/1931 | Church | |
| 1,888,343 A | 11/1932 | Bohlman et al. | |
| 2,100,796 A | 11/1937 | Church | |
| 2,139,413 A | 12/1938 | Kreidel | |
| 2,158,757 A * | 5/1939 | Kuestermeier | 285/340 |
| 2,233,214 A | 2/1941 | Neil | |
| 2,255,673 A | 9/1941 | McDermott | |
| 2,474,319 A * | 6/1949 | Muller | 285/343 |
| 2,503,169 A | 4/1950 | Phillips | |
| 2,651,529 A | 9/1953 | Wayman | |
| 2,761,705 A | 9/1956 | Kreidel | |
| 2,833,569 A | 5/1958 | Budnick | |
| 2,836,438 A | 5/1958 | Turnipseed | |
| 3,275,347 A | 9/1966 | Scott | |
| 3,393,931 A | 7/1968 | Wurzburger | |
| 3,647,934 A | 3/1972 | Hurtt | |
| 3,667,783 A | 6/1972 | Sotolongo | |
| 3,794,362 A | 2/1974 | Mooney et al. | |
| 3,801,131 A | 4/1974 | Appleton | |
| 3,907,335 A | 9/1975 | Burge et al. | |
| 3,972,547 A | 8/1976 | Itoya | |
| 4,019,762 A | 4/1977 | Eidelberg et al. | |
| 4,030,741 A | 6/1977 | Fidrych | |
| 4,145,075 A | 3/1979 | Holzmann | |

(Continued)

*Primary Examiner*—Aaron M Dunwoody
(74) *Attorney, Agent, or Firm*—Fattibene and Fattibene; Paul A. Fattibene

(57) ABSTRACT

A moisture proof electrical connector assembly for securing an electrical metal tube or conduit to a connector body having opposed end portions and having a bore extending therethrough wherein an end portion includes a first linear length sized and shaped to receive a metal tube or conduit and a second linear length having a diverging inner surface provided with an intermediate shoulder for delineating the first length form the second linear length, and a complementary sealing gland for rendering the entire assembly moisture proof.

5 Claims, 5 Drawing Sheets

U.S. PATENT DOCUMENTS

| | | |
|---|---|---|
| 4,250,348 A | 2/1981 | Kitagawa |
| 4,508,466 A | 4/1985 | Dennis |
| 4,515,991 A | 5/1985 | Hutchison |
| 4,547,623 A | 10/1985 | Van Brunt et al. |
| 4,549,755 A | 10/1985 | Kot et al. |
| 4,606,562 A | 8/1986 | Saraceno |
| 4,608,454 A | 8/1986 | Lackinger |
| 4,676,533 A | 6/1987 | Gerondale |
| 4,877,270 A | 10/1989 | Phillips |
| 4,915,427 A | 4/1990 | Zahuranec |
| 4,983,784 A | 1/1991 | Whitlock |
| 5,028,078 A | 7/1991 | Schwarz et al. |
| 5,037,140 A | 8/1991 | Anderson |
| 5,068,494 A | 11/1991 | Bolante |
| 5,208,427 A | 5/1993 | Couto et al. |
| 5,230,536 A | 7/1993 | Rider et al. |
| 5,393,109 A | 2/1995 | Gumpel |
| 5,466,890 A | 11/1995 | Stagnitti |
| 5,621,191 A | 4/1997 | Norris et al. |
| 5,951,327 A | 9/1999 | Marik |
| 6,073,976 A | 6/2000 | Schmidt et al. |
| 6,268,565 B1 | 7/2001 | Daoud |
| 6,641,180 B2 | 11/2003 | Udhoefer |
| 6,702,336 B1 | 3/2004 | Chelchowski et al. |
| 6,840,550 B2 | 1/2005 | Sundholm |
| 6,851,728 B2 | 2/2005 | Minami |
| 6,988,746 B2 | 1/2006 | Olson |
| 7,002,077 B2 | 2/2006 | Pyron |
| 7,080,859 B1 | 7/2006 | Gretz et al. |
| 2004/0090067 A1 | 5/2004 | Pridham |

\* cited by examiner

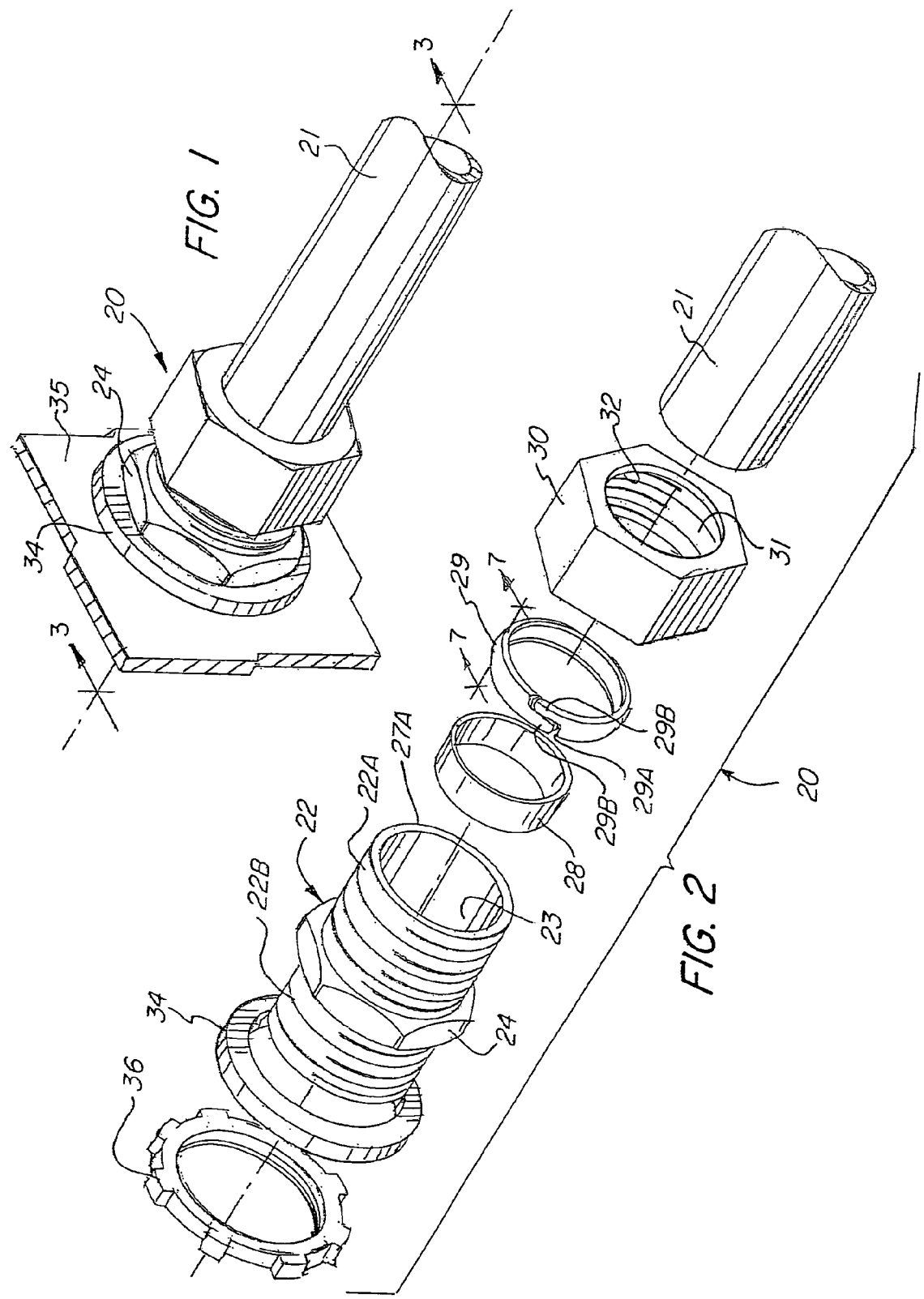

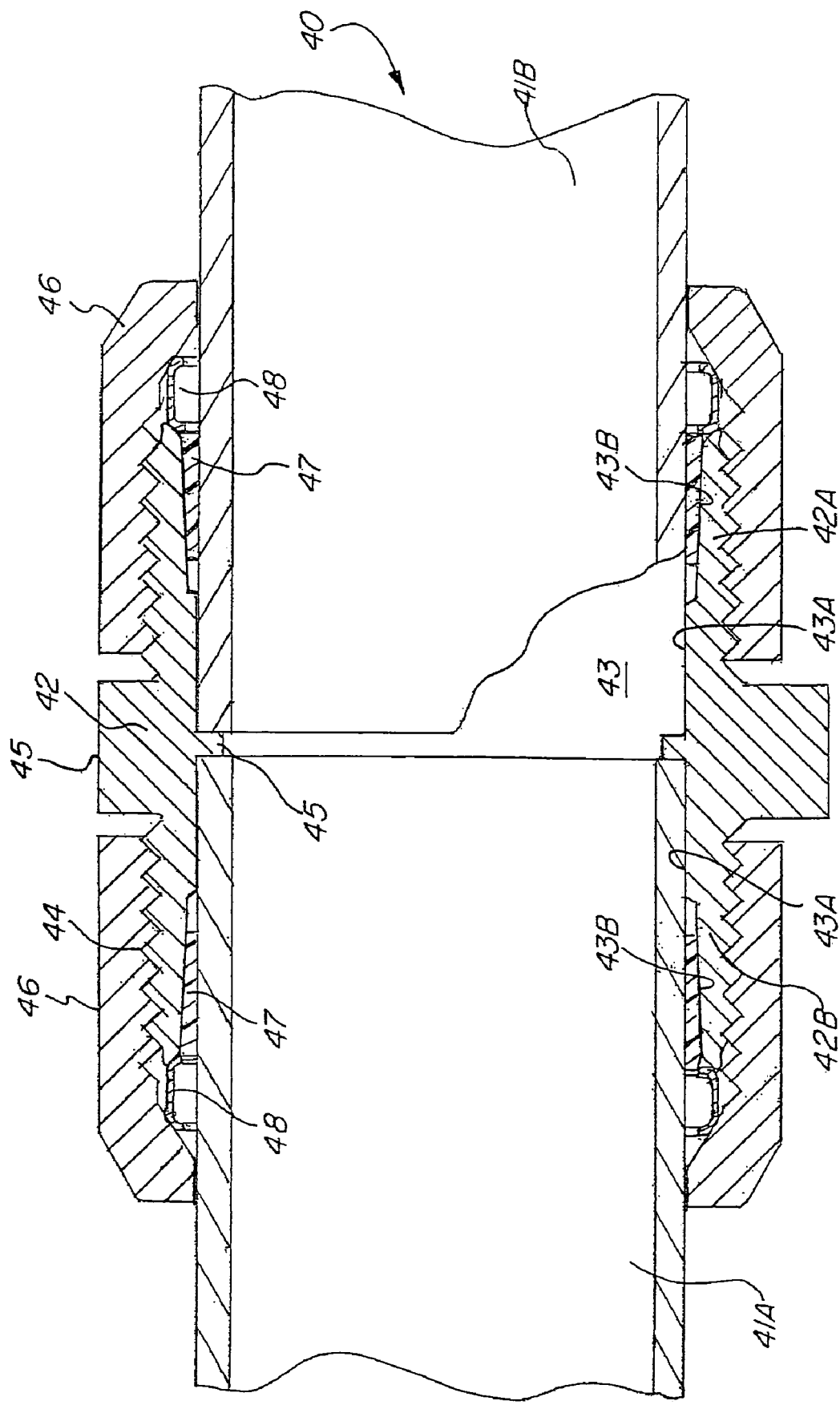

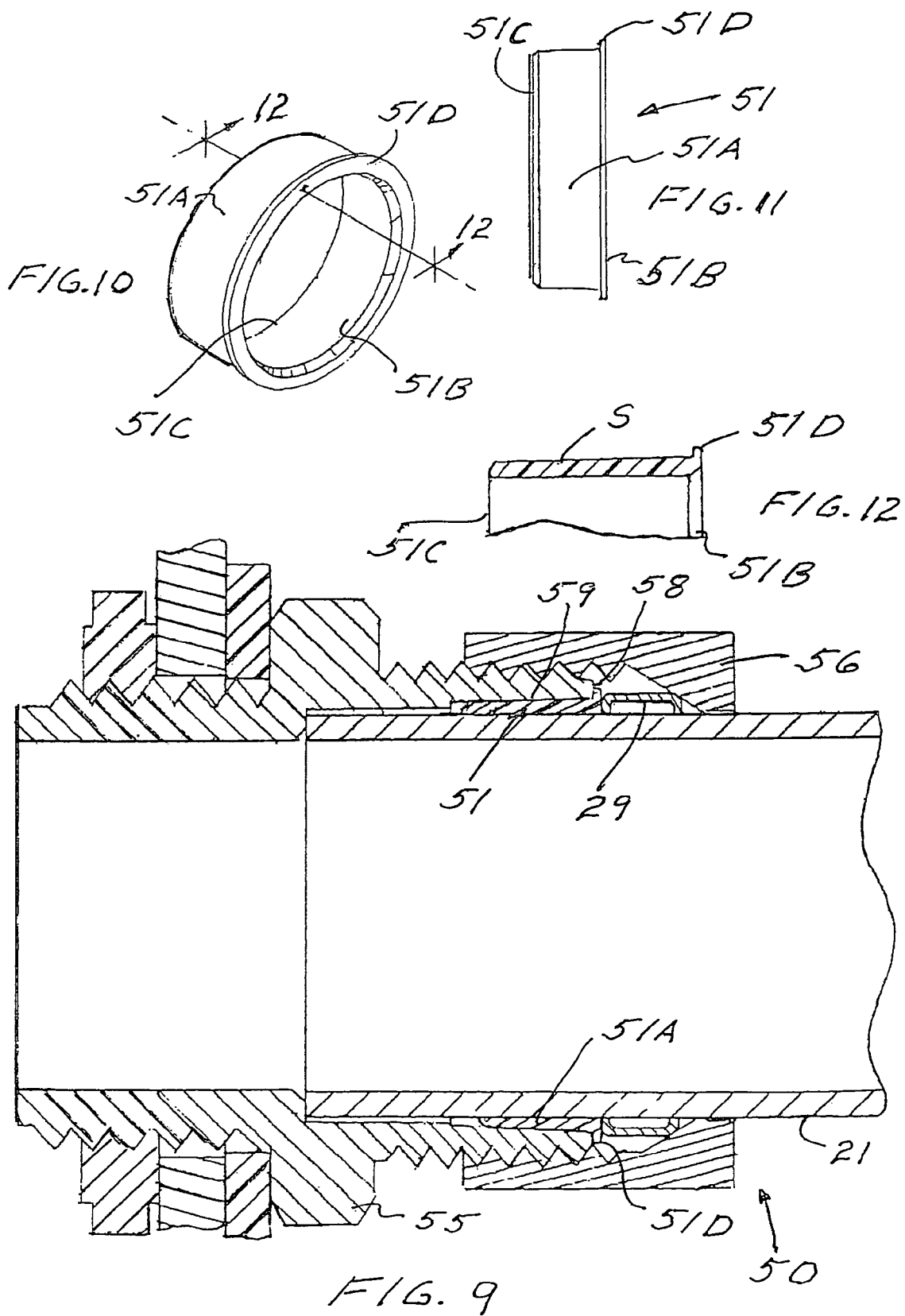

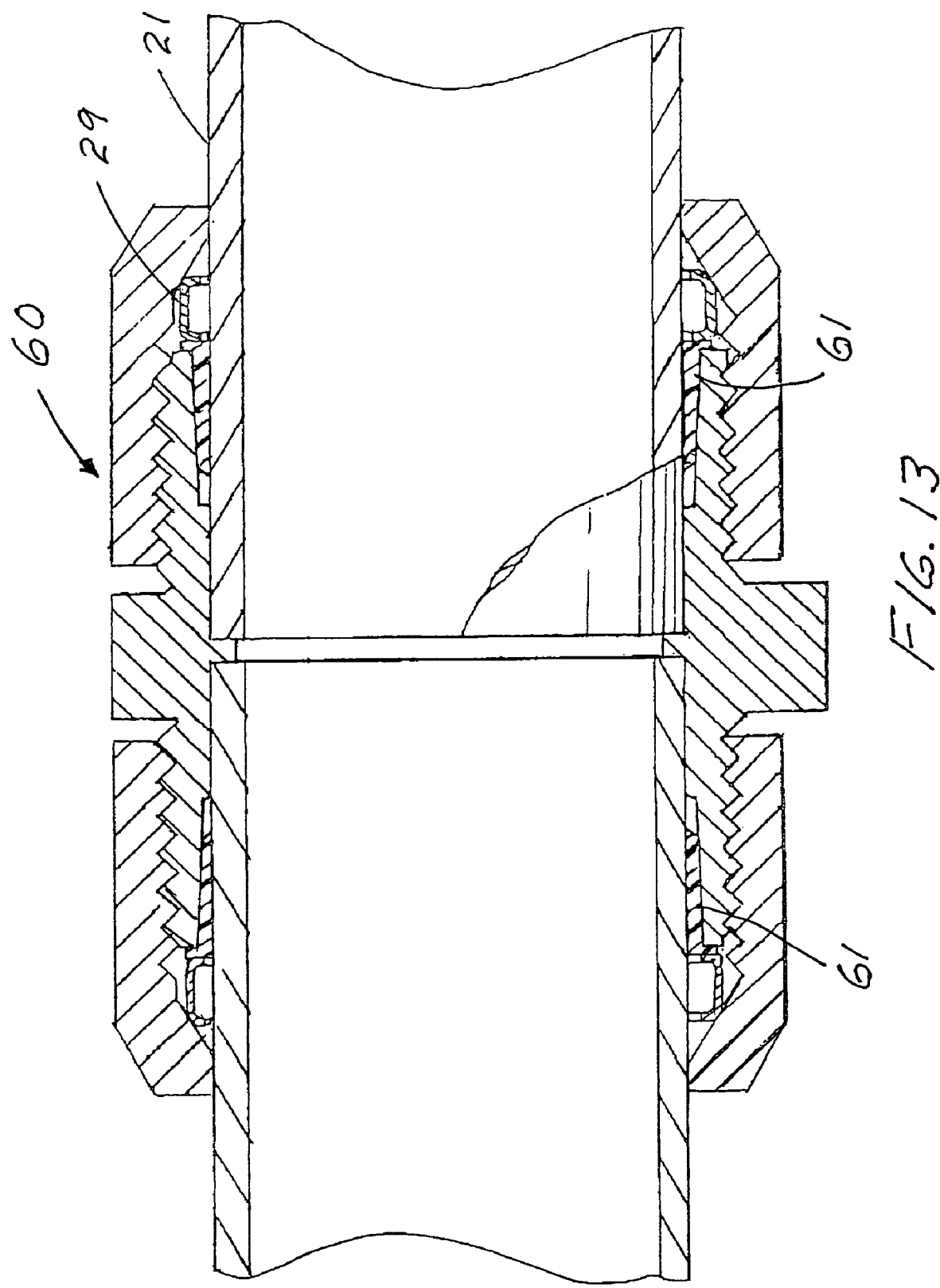

WEATHERPROOF COMPRESSION CONNECTING ASSEMBLY FOR SECURING ELECTRICAL METAL TUBING

RELATED APPLICATION

This application is a divisional application of application Ser. No. 11/005,214 filed Dec. 6, 2004 now U.S. Pat. No. 7,390,027 for Weatherproof Compression Connecting Assembly For Securing Electrical Metal Tubing, which is a continuation in part application of application Ser. No. 10/639,907 filed Aug. 13, 2003, now abandoned, for Weatherproof Compression Connecting Assembly For Securing Electrical Metal Tubing.

FIELD OF THE INVENTION

This invention is directed to a pipe assembly for securing an electrical metal conduit, and more specifically to a weatherproof pipe assembly in the form of a connector assembly or a coupling assembly having a watertight sealing gland and an electrical grounding compression ring that is compressively fitted onto the connected end of the conduit for securing the conduit used for shielding therein an electrical conductor or cable.

BACKGROUND OF THE INVENTION

Heretofore it was common practice to secure a conduit that shields electrical conductors, wires or cables by inserting one end of a conduit into an externally threaded inlet end of a connecting body and securing the conduit to the threaded inlet end of the connecting body by a suitable tightening nut. The outlet end of the connecting body in turn was secured to an electrical outlet box by inserting the other or outlet end of the connecting body into the knockout hole of the electrical outlet box and securing the same by a locking nut or other suitable means, e.g. a snap fit retaining means as disclosed in a co-pending patent application Ser. No. 10/283,978 filed Oct. 30, 2002, now U.S. Pat. No. 6,860,758, which is incorporated herein by reference. It has been noted that many prior connecting assemblies did not satisfactorily prohibit rain or water from seeking its way through the connection. Moisture proofing such pipe assemblies has been a continuing problem in the art. Also, electrical grounding of conduits was not at all times positive.

SUMMARY OF THE INVENTION

An object of this invention is to provide an improved pipe assembly in the form of a coupling or connector arrangement which is capable of prohibiting water or rain from seeping through the coupling or connector assembly.

Another object is to provide an improved coupling or connector assembly capable of effecting a positive electrical grounding of a conduit connected thereto.

Another object is to provide an improved electrical coupling or connector assembly that is relatively simple to fabricate, easy to assemble and positive in operation.

The foregoing objects and other features and advantages are readily obtained by a pipe assembly that includes a connector or coupling type body provided with an inlet end having an opening adapted to receive a conduit, and an outlet end having an opening to which another conduit may be coupled or through which the electrical conductors, wires, or cables extended through the connected conduit may extend. The external surface of the inlet end is threaded to receive a connecting nut for securing the conduit to the inlet end. The connector or coupling body is provided with a through bore having a shoulder formed intermediate the length thereof to define a stop to limit the distance a conduit may be inserted thereinto. The internal surface of the inlet end of the connector or coupling body is provided with a second annular ridge or stop, disposed between the intermediate shoulder stop and the opening to the inlet end. The internal surface of the inlet end defined between the conduit shoulder stop and the ridge stop or first portion is generally shaped and sized to snugly receive the outer surface of the conduit. The internal surface of the inlet end disposed between the ridge stop and the inlet opening or second portion is provided with a taper that diverges or increases, i.e. slopes radially outward toward the inlet opening.

To effect a waterproof seal and a positive electric ground for the conduit, a metallic split compression ring is fitted onto the end of the conduit. Also fitted onto the end of the conduit is a plastic sealing ring having the outer surface thereof tapered to complement the internal tapered portion of the connector or coupling inlet end. The arrangement is such that as the connecting nut is tightened onto the threaded inlet end, the metallic split compression ring simultaneously urges the plastic sealing ring into a positive sealing relationship between the conduit and the inlet end of the connector or coupling body as the split metallic ring is compressed onto the conduit to insure a positive electric grounding of the conduit while imparting a friction holding force sufficient to prohibit the conduit from being pulled out of the connector or coupling body.

In another form of the invention, the plastic or resilient sealing ring is provided with a radially outward flange or collar circumscribing the inlet end of the sealing ring arranged to abut the inlet end of the connector or coupling body.

Other features and advantages will become readily apparent in view of the following detailed description and drawings.

IN THE DRAWINGS

FIG. 1 is a perspective view of an assembled conduit connector embodying the present invention.

FIG. 2 is an expanded perspective view illustrating the component parts of an conduit connector embodying the invention.

FIG. 8 is a sectional side view of a coupling assembly embodying the invention.

FIG. 9 is a sectional side view of the connector assembly similar to FIG. 3 to illustrate a modified form of the invention.

FIG. 10 is a perspective view of a modified form of the sealing ring as shown in FIG. 9.

FIG. 11 is a side view of the sealing ring of FIG. 10.

FIG. 12 is a sectional view taken along line 12-12 on FIG. 10.

FIG. 13 is a sectional side view of a coupler assembly similar to the coupler assembly of FIG. 8 to illustrate another modified form of the invention.

DETAILED DESCRIPTION OF THE PREFERRED EMBODIMENTS

Figure 6:
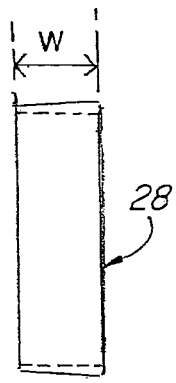
FIG. 6 is a side view of the sealing gland component.
Figure 4:
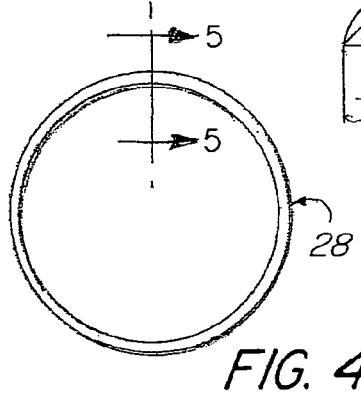
FIG. 4 is a plan view of the sealing gland component.
Figure 7:
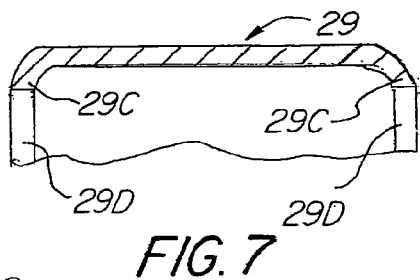
FIG. 7 is a sectional view taken along line 7-7 on FIG. 2.

Referring to the drawings, there is illustrated in FIGS. 1 and 2 a pipe assembly embodying the invention. Pipe assembly, as broadly defined herein, means either a connector assembly 20, by which a conduit 21 is connected to an electrical junction box 35 as shown in FIG. 1, or coupling assembly 40 as shown in FIG. 8 for coupling two conduits 41A and 41B in end to end relationship.

The illustrated embodiment of the invention as depicted in FIGS. 1 to 7 is directed to a pipe assembly in the form of a connector assembly 20 as defined herein, which includes a connector body 22 which is generally formed as casting of zinc or other suitable metal. The connector body 22 includes opposed end portions, e.g. an inlet end 22A and an outlet end 22B. In the illustrated embodiment of FIGS. 1 and 2, the outer surfaces of the inlet end 22A and outlet end 22B are provided with suitable external threads. The connector body 22 also includes a through bore 23, as will be hereinafter described in more detail. Intermediate the inlet end 22A and outlet end 22B, the connector body 22 is provided with a radially outwardly extending flange 24 having a hexagonal shape. However, it will be understood that the flange 24 may assume any suitable shape that will facilitate gripping the same for purposes of assembling.

Intermediate between the inlet opening 27A and the outlet opening 27B of the through bore 23 there is formed an internal shoulder 25 which functions as a stop to limit the distance a conduit 21 can be inserted into the inlet end 22A of the connector body 22. Generally, such conduits are formed of metal, e.g. steel and the like.

Figure 3:
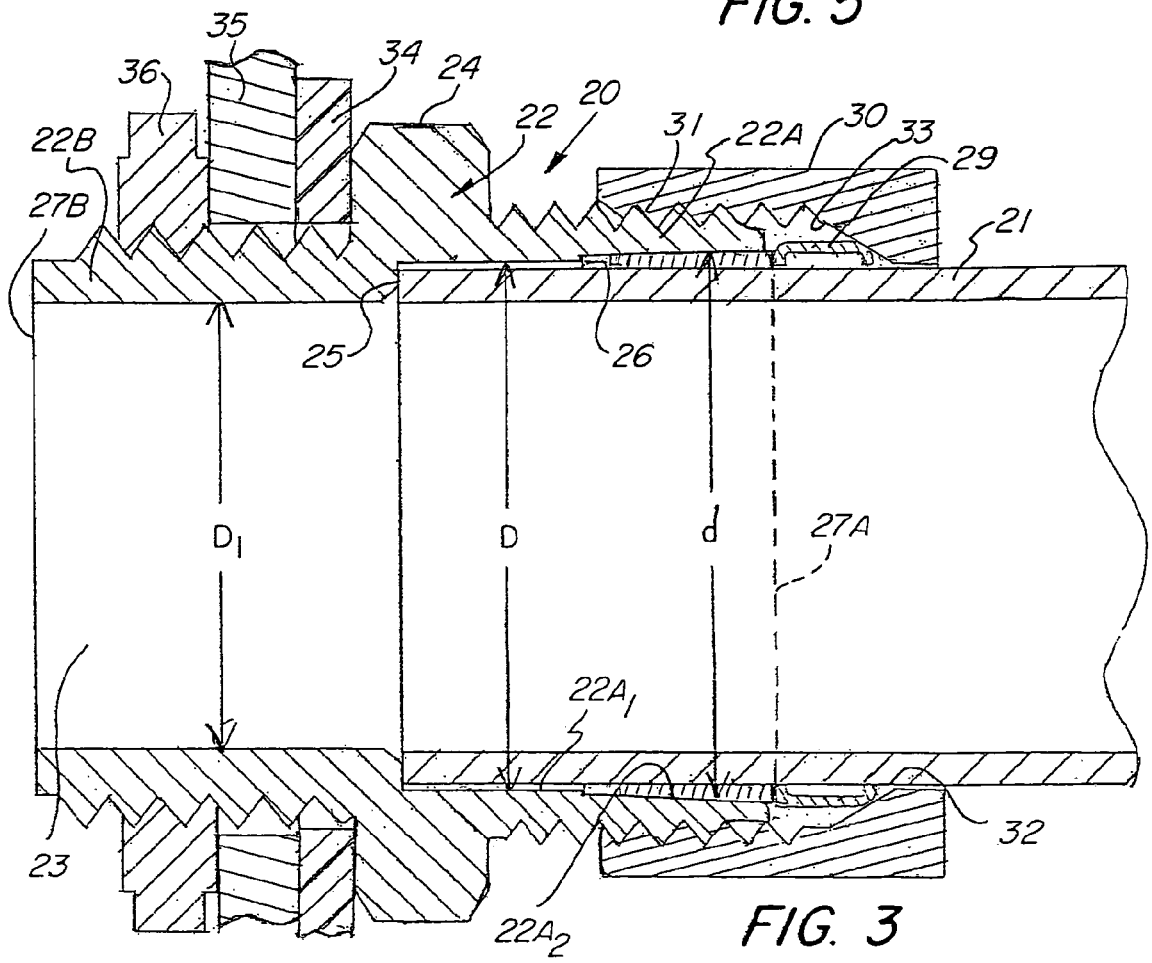
FIG. 3 is a side sectional view of the connector assembly embodying the invention taken along line 3-3 on FIG. 1.

In accordance with this invention, the portion of the through bore 23 defining the distal portion $22A_1$ of the inlet end 22A, adjacent the stop shoulder 25, or first portion has a substantially uniform diameter D of a size and shape to snugly receive the end portion of the conduit as shown in FIG. 3. The distal or first linear length or portion $22A_1$ of the inlet end 22 extends from the stop shoulder 25 to an intermediate ridge or shoulder 26 located at a point between the inlet opening 27A and the shoulder stop 25. The internal surface of the through bore 23 extending from the intermediate shoulder 26 to the inlet opening 27A or second linear length or portion $22A_2$ tapers outwardly so that the diameter "d" of proximate end or second portion $22A_2$ progressively increases toward the inlet opening 27A. The portion of the bore 23 defining the outlet end 22B has a diameter $D_1$ which is slightly less than diameter D, as determined by the thickness of the stop shoulder 25.

Figure 5:
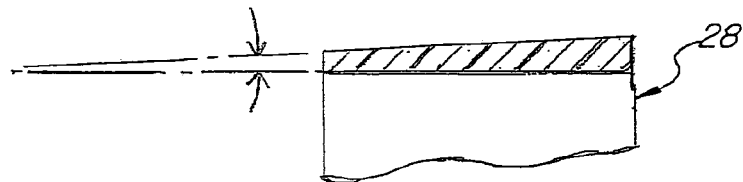
FIG. 5 is an enlarged sectional view taken along line 5-5 on FIG. 4.

A sealing gland 28 in the form of a ring is snugly fitted onto the end of the conduit 21 that is inserted into the inlet end 22A of the connector body 22. The sealing gland 28 is provided with a width W which is arranged to be received into the proximate or tapered portion $22A_2$ of the inlet end 22A. As best seen in FIG. 5, the external periphery of the sealing gland 28 is tapered to complement the taper defined by the inner surface of the proximate portion $22A_2$ of the inlet end 22A. Preferably, the width W of the sealing gland 28 is substantially equal to the length of the tapered portion $22A_2$.

Also positioned onto the end of the conduit 21 to be inserted into the inlet end 22A, and preceding the placement of the sealing gland 28 onto the conduit 21 is a split compression ring 29. Referring to FIG. 3, the compression ring 29 is preferably formed of a spring steel or the like with a diameter sized so as to be loosely fitted onto the conduit 21. The compression ring 29 is provided with a transverse slot or cut 29A as best seen in FIG. 2, to define a small space or gap between the opposed ends of the ring 29. As shown in FIG. 3, the cut or slot 29A that defines the split ring 29 forms opposed, juxtapositioned, slightly spaced apart tongues 29B, 29B. Thus, the cut 29A defines spaced tongues 29B, 29B that are longitudinally extended and disposed in a common plane to define a split ring of 360°.

In the illustrated embodiment, the opposed edges of the compression ring 29 are slightly offset or bent to define lips 29C, 29C that extend about the opposed peripheries of the ring 29. The arrangement is such that when the ring 29 is compressed, the peripheral surface 29D defined by the opposed lips 29B, 29B are arranged to engage the end of the conduit 21 with a force sufficient to prohibit the conduit 21 from becoming separated from the connector body 22 in the assembled position of the connector assembly and provides a positive electrical ground.

A fastening nut 30 is provided for securing the conduit 21 to the inlet end of the connector body 22. The nut 30 is provided with internal threads 31 by which it can be threaded onto the external threads of the inlet end 22A of the connector body. The nut 30 is provided with an opening 32 sized to permit the nut 30 to be fitted onto the end of a conduit. Circumscribing the nut opening 32, the nut 30 is provided with a cam surface 33 arranged to engage the compression ring 29 as the nut 30 is threaded onto the inlet end 22A of the connector body 22 to secure the conduit to the connector body.

Completing the connector assembly 20 is a resilient washer 34 formed of a resilient plastic, rubber and the like, which is arranged to be fitted onto the outlet end 22B of the connector body 22. In operation, the washer 34 is fitted onto the outlet end 22B of the connector body 22 so as to be positioned between the flange 24 and the side wall 35 of a junction box or the like. A lock nut 36 or other suitable locking fastener is fitted onto the outlet end portion 22B of the connector to positively secure the connector body 22 to an electrical junction box or the like. As the locking nut 36 is tightened onto the outlet end 22B of the connector body 22, the resilient washer 34 is compressed or wedged between the flange 24 and the side wall 35 of the junction box. Accordingly, the resilient washer 34 provides a seal about the knockout opening of the junction box 35 that receives the outlet end portion 22A of the connector body.

In assembling the connector assembly 20, the fastening nut 30 is positioned onto the end of the conduit, as noted in FIG. 3. The compression ring 29 is then fitted onto the end of the conduit, followed by the positioning the sealing gland 28 onto the end of the conduit. With the fastening nut 30, compression ring 29 and sealing gland 28 thus positioned onto the end of the conduit, the conduit is inserted into the inlet end 22A until the end of the conduit 21 is brought into abutting relationship with stop shoulder 25. With the conduit 21 seated against the stop shoulder 25, the fastening nut 30 is tightened onto the inlet end 22A. In so tightening the nut 30, the cam surface 33 upon engaging the compression ring 29 will cause the compression ring to be urged against the sealing gland 28, causing the sealing gland 28 to wedge itself between the outer surface of the conduit 21 and the internal tapered surface of the inlet portion $22A_2$ to form a fluid tight seal thereat while causing the split compression ring 29 to compress tightly onto the periphery of the conduit 21 to positively secure the connection so as to preclude any separation or pull out of the conduit 21 from the connector body 22. The compression ring 29 formed of a spring steel also insures a positive electrical grounding of the conduit and connector assembly.

It will be understood that the conduit 21 may be connected to the connector body 22 either before or after the connector body 22A has been attached to a juncture box 35 or the like.

To secure the described connector body 22 to a juncture box 35, the resilient washer 34 is positioned on the outlet end 22B, which is then inserted through a knockout hole of a juncture box and secured thereto by the lock nut 36.

FIG. 8 illustrates a modified embodiment of the invention as applied to a coupler assembly 40 for connecting conduits 41A and 41B in end to end relationship. As shown, the coupler assembly 40 includes a coupling body 42 which may be formed of a suitable material, e.g. a zinc casting or the like. The coupler body 42 is provided with opposed end portions which, for purposes of description, may be defined as an inlet and outlet end portions 42A, 42B having a through bore 43. In the illustrated embodiment, the outer surfaces of the inlet and outlet portions 41A, 41B are externally threaded as indicated as 44. Between the opposed end openings of the bore, there is provided on the internal surface thereof a circumscribing rib, ridge or shoulder 45. As will be noted, the shoulder 45 defines a stop to limit the insertion of conduits 41A, 41B into the opposed end portions of the coupling body 42.

The respective opposed end portions 42A, 42B are each provided with a bore portion 43A having a substantially uniform diameter sized to snugly receive the outer diameter of the conduit to be fitted thereinto, and an internally tapered portion 43B similar to that hereinbefore described with respect to the connector body 22.

Externally, the coupling body 42 is provided with an external radial flange 45A having a shape that can be readily gripped to effect the turning thereof if necessary. The external surfaces of the respective opposed ends of the coupler body 42 are suitably threaded for receiving a fastening nut 46 similar to the fastening nut 30 hereinbefore described.

A sealing gland 47 and a compressing ring 48, in the form hereinbefore described, is fitted onto each end of the respective conduits 41A, 41B to complete the assembly, as hereinbefore described.

To assemble the described coupler 40, each of the respective conduits are fitted with the fastening nut 46, compression ring 48 and sealing gland 47 in the manner hereinbefore described. With the nut 46, compression ring 48 and sealing gland 47 so positioned on the end of a conduit, the end of the conduit is inserted into one end portion of the coupling body 42 until the conduit is seated or abuts the stop shoulder 45. The fastening nut 46 is then threaded onto its respective end portion until the sealing gland 47 has wedged itself into sealing relationship between the coupling body 42 and the conduit, and the compression ring 48 is tightly compressed onto the conduit as hereinbefore described.

FIGS. 9 to 12 illustrate a further modification of the invention. FIG. 9 illustrates a connector assembly 50 similar to that described with respect to FIG. 3, with the exception that the sealing ring 51 embodies a modified construction. Referring to FIG. 10, the modified sealing ring 51 includes a ring portion 51A having an inlet opening 51B and an outlet opening 51C. Circumscribing the inlet opening 51B of the ring portion 51A is a radially outwardly extending flange or collar 51D. As best seen in FIG. 12, the outer surface S of the ring portion 51A tapers or diverges outwardly from the outlet opening toward the flange or collar 51D in a progressively radially outwardly manner similar as shown and described with respect to FIG. 5. In all other respects, the coupler body 55, fastening nut 56 and compression ring 57 are similar or identical to that hereinbefore described with respect to FIG. 3. The assembly of the respective connector components of FIG. 9 is similar to that described with respect to FIGS. 1 to 3.

In the assembled position of the modified connector assembly 50 of FIG. 9, it will be noted that the flange or collar 51D abuts the edge of the inlet opening 58 of the connector body 55 with the outer surface S of the ring portion 51A complementing the taper 59 that defines the proximal inner surface of the connector body adjacent the inlet opening 58, as hereinbefore described. By providing the sealing ring 51 with the annular collar or flange 51D, an enhanced liquid tight seal is effected. In all other respects, the structure and function of the respective component parts of the connector assembly of FIGS. 9 to 12 are similar to that hereinbefore described with respect to FIGS. 1 to 7.

FIG. 13 is directed to a modified coupler assembly 60. Coupler assembly 60 is similar to the coupler assembly described with respect to FIG. 8, except that the sealing ring 61 of FIG. 13 embodies the construction of the sealing ring disclosed and described with respect to FIGS. 10 to 12. In all other respects, the coupler assembly 60 is similar to that shown and described in FIG. 8.

From the foregoing, it will be apparent that a fluid tight and a pressure tight connection is effected between the connector or coupler body and its corresponding conduit whereby the assembly is rendered moisture-proof and any pullout or separation of the conduit is positively prohibited while at the same time provides for a positive electrical grounding of the conduit to the associated connector or coupler body.

While the invention has been described with respect to several embodiments thereof, it will be understood that variations and modifications may be made without departing from the spirit or scope of the invention.

What is claimed is:

1. A pipe assembly comprising:
 a coupler body having a bore extending therethrough, said bore defining opposed end portions terminating in an end opening,
 each of said end portions having a first inner linear length and a second outer linear length,
 a metal conduit receivable in each of said opposed end portions,
 each of said first inner linear length having a shape and size to snugly receive an end portion of an associated metal conduit, and
 each of said second outer linear length having an internal surface that diverges outwardly toward an associated end opening,
 a tubular sealing gland having a bore sized to be fitted onto the end portion of each of said metal conduits,
 each of said tubular sealing glands having a diverging outer surface complementing the diverging interior surface of said second linear length,
 a metallic split compression ring loosely fitted onto the end portion of each of said metal conduits,
 and a fastening nut fitted onto the end portion of each of said metal conduits for securing each of said metal conduits to each of said opposed end portions whereby said sealing gland is urged into sealing relationship with said internal surface of an associated second linear length, and compressing said metallic compression ring onto said metal conduit,
 said bore including an internal stop shoulder defining a stop to limit the distance each of said metal conduits is inserted into its corresponding end portion, and
 an intermediate shoulder within each of said end portions longitudinally spaced from said stop shoulder to define said first linear length from said second linear length in said end portions.

2. A pipe assembly as defined in claim 1 wherein each of said plastic sealing glands includes
 a laterally outwardly flange circumscribing about one end thereof, said laterally outwardly flange having an outer diameter greater than said end opening whereby said laterally outwardly flange abuts the periphery edge of said end opening.

3. A pipe assembly as defined in claim 2 wherein said tubular sealing gland is formed of a resilient material.

4. A pipe assembly as defined in claim 1 wherein said sealing gland includes:
- a ring portion having a ring inlet opening and a ring outlet opening,
- said ring portion having an outer peripheral surface that tapers radially outwardly toward said ring inlet opening,
- and a radially outwardly extending flange circumscribing said ring inlet opening,
- said radially outwardly extending flange having an outer diameter which is greater than the diameter of said inlet opening of said coupler body,
- said radially outwardly extending flange being disposed in abutting sealing relationship with the peripheral edge of said coupler body defining said inlet opening of said coupler body.

5. A pipe assembly comprising:
- a coupler body having a bore extending therethrough,
- said coupler body having, opposed end portions terminating in an end opening,
- each of said end portions including a first inner linear length sized and shaped for receiving an end portion of an electrical metal conduit therein, and
- a second linear length having a sloping inner surface diverging outwardly toward said end opening,
- a tubular sealing gland having a bore sized to be fitted onto an end portion of an electric metal conduit,
- said sealing gland having a sloping outer surface complementing said diverging inner surface of said second linear length,
- a metallic split compression ring adapted to be fitted onto an end portion of an electric metal tube, and a fastening nut fitted onto an end portion of an electric metal tube whereby said sealing gland is urged into sealing relationship with said inner surface of said second linear length as said fastening nut is tightened onto its associated end portion.

* * * * *